United States Patent
Sakuma et al.

(10) Patent No.: US 12,451,518 B2
(45) Date of Patent: Oct. 21, 2025

(54) SECONDARY BATTERY HAVING A FILM COVERING A NEGATIVE ACTIVE MATERIAL LAYER

(71) Applicant: MURATA MANUFACTURING CO., LTD., Kyoto (JP)

(72) Inventors: Tomomi Sakuma, Kyoto (JP); Masahiro Miyamoto, Kyoto (JP); Raman Kukreja, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 498 days.

(21) Appl. No.: 18/080,321

(22) Filed: Dec. 13, 2022

(65) Prior Publication Data

US 2023/0114874 A1   Apr. 13, 2023

Related U.S. Application Data

(63) Continuation of application No. PCT/JP2021/009519, filed on Mar. 10, 2021.

(30) Foreign Application Priority Data

Jun. 15, 2020 (JP) .................................. 2020-103184

(51) Int. Cl.
    *H01M 10/0567* (2010.01)
    *H01M 10/0525* (2010.01)
    *H01M 10/0569* (2010.01)

(52) U.S. Cl.
    CPC ... *H01M 10/0567* (2013.01); *H01M 10/0525* (2013.01); *H01M 10/0569* (2013.01); *H01M 2300/0028* (2013.01)

(58) Field of Classification Search
    CPC ......... H01M 10/0567; H01M 10/0525; H01M 10/0569
    (Continued)

(56) References Cited

U.S. PATENT DOCUMENTS

| 7,163,768 B2 * | 1/2007 | Utsugi .............. H01M 10/0567 429/231.95 |
| 2006/0216612 A1 * | 9/2006 | Jambunathan .... H01M 10/0566 429/50 |

(Continued)

FOREIGN PATENT DOCUMENTS

| CN | 105895958 A | 8/2016 |
| JP | 2001250535 A | 9/2001 |

(Continued)

OTHER PUBLICATIONS

International Search Report of corresponding PCT application PCT/JP2021/009519, dated Apr. 27, 2021.

*Primary Examiner* — Mark Ruthkosky
(74) *Attorney, Agent, or Firm* — K&L Gates LLP

(57) ABSTRACT

A secondary battery includes a positive electrode, a negative electrode, and an electrolytic solution. The negative electrode includes a film covering a negative electrode active material layer. The electrolytic solution includes a chain carboxylic acid ester. According to an analysis of the film by inductively coupled plasma optical emission spectroscopy, a content of boron in the film is greater than or equal to 10 $\mu mol/m^2$ and less than or equal to 30 $\mu mol/m^2$, a content of sulfur in the film is greater than or equal to 20 $\mu mol/m^2$ and less than or equal to 70 $\mu mol/m^2$, and a ratio of the content of sulfur to the content of boron is greater than or equal to 1.0 and less than or equal to 3.0.

5 Claims, 2 Drawing Sheets

(58) Field of Classification Search
USPC .......................................................... 429/343
See application file for complete search history.

(56) References Cited

U.S. PATENT DOCUMENTS

| | | |
|---|---|---|
| 2007/0054179 A1 | 3/2007 | Kusachi et al. |
| 2008/0020286 A1 | 1/2008 | Haruna et al. |
| 2009/0029252 A1 | 1/2009 | Nakai et al. |
| 2015/0207147 A1 | 7/2015 | Nagai et al. |
| 2015/0303518 A1 | 10/2015 | Iriyama |
| 2018/0076484 A1 | 3/2018 | Nakatsutsumi et al. |
| 2021/0288322 A1* | 9/2021 | Kitada .................. H01M 4/525 |

FOREIGN PATENT DOCUMENTS

| | | |
|---|---|---|
| JP | 2008027782 A | 2/2008 |
| JP | 2009026691 A | 2/2009 |
| JP | 2014011065 A | 1/2014 |
| JP | 2014232704 A | 12/2014 |
| JP | 2016100051 A | 5/2016 |
| JP | 2016201244 A | 12/2016 |
| WO | 2005029613 A1 | 3/2005 |
| WO | 2014069460 A1 | 5/2014 |
| WO | 2017047019 A1 | 3/2017 |

* cited by examiner

SECONDARY BATTERY HAVING A FILM COVERING A NEGATIVE ACTIVE MATERIAL LAYER

CROSS REFERENCE TO RELATED APPLICATIONS

The present application is a continuation of PCT application no. PCT/JP2021/009519, filed on Mar. 10, 2021, which claims priority to Japanese patent application no. JP2020-103184, filed on Jun. 15, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

Specifically, in order to obtain a superior cyclability characteristic, a ratio between two peak intensities is defined regarding an analysis result on a surface of a negative electrode obtained by X-ray photoelectron spectroscopy (XPS). In order to obtain a superior storage life, a ratio based on a sulfur concentration is defined regarding an analysis result on a surface of a negative electrode obtained by XPS. In order to improve a cyclability characteristic, a film including a salt such as a sulfuric acid salt is provided on a negative electrode active material layer. In order to suppress a time-varying change in battery characteristic during a long-term storage, a compound including a boron-oxygen bond is included in an electrolytic solution.

In order to manufacture an electrode (a surface-modified electrode) modified by, for example, heating, a coating agent for electrode surface modification including a compound such as a sulfuric acid ester compound is applied on a surface of the electrode. In order to suppress a rise in resistance of a negative electrode, a film including boron and oxalate ions, that is, a film derived from an oxalatoborate type compound, is provided on a surface of a negative electrode. In order to suppress precipitation of lithium while suppressing a rise in initial resistance of a negative electrode active material layer, an electrolytic solution includes lithium bis(oxalato)borate, and a film including a deposition product of the lithium bis(oxalato)borate is provided on a surface of a negative electrode active material particle.

SUMMARY

The present application relates to a secondary battery.

Although consideration has been given in various ways to improve performance of a secondary battery, a swelling characteristic is not sufficient yet and there is still room for improvement.

The present technology has been made in view of such an issue, and relates to providing a secondary battery that makes it possible to achieve a superior swelling characteristic according to an embodiment.

A secondary battery according to an embodiment of the present technology includes a positive electrode, a negative electrode, and an electrolytic solution. The negative electrode includes a film covering a negative electrode active material layer. The electrolytic solution includes a chain carboxylic acid ester. According to an analysis of the film by inductively coupled plasma optical emission spectroscopy, a content of boron in the film is greater than or equal to 10 $\mu mol/m^2$ and less than or equal to 30 $\mu mol/m^2$, a content of sulfur in the film is greater than or equal to 20 $\mu mol/m^2$ and less than or equal to 70 $\mu mol/m^2$, and a ratio of the content of sulfur to the content of boron is greater than or equal to 1.0 and less than or equal to 3.0.

Here, the content of sulfur in the film and the content of boron in the film are each measured by the analysis of the film by inductively coupled plasma optical emission spectroscopy. A procedure of analyzing the film by inductively coupled plasma optical emission spectroscopy will be described in detail later.

According to the secondary battery of an embodiment of the present technology, the negative electrode includes the film, the electrolytic solution includes the chain carboxylic acid ester, and all of the above-described three conditions are satisfied regarding an analysis result on the film obtained by inductively coupled plasma optical emission spectroscopy. This makes it possible to obtain a superior swelling characteristic.

Note that effects of the present technology are not necessarily limited to those described herein and may include any of a series of suitable effects in relation to the present technology.

DETAILED DESCRIPTION

One or more embodiments of the present technology are described below in further detail including with reference to the drawings.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
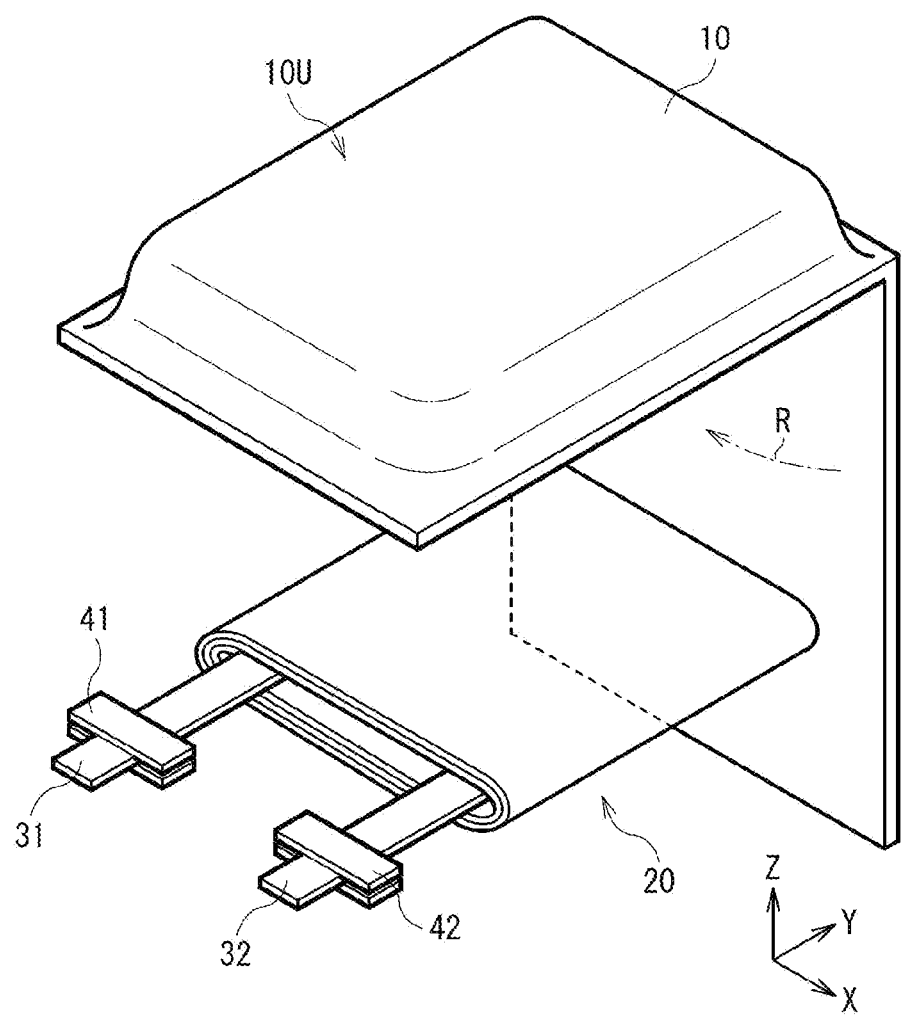
FIG. 1 is a perspective view of a configuration of a secondary battery according to an embodiment of the present technology.
Figure 2:
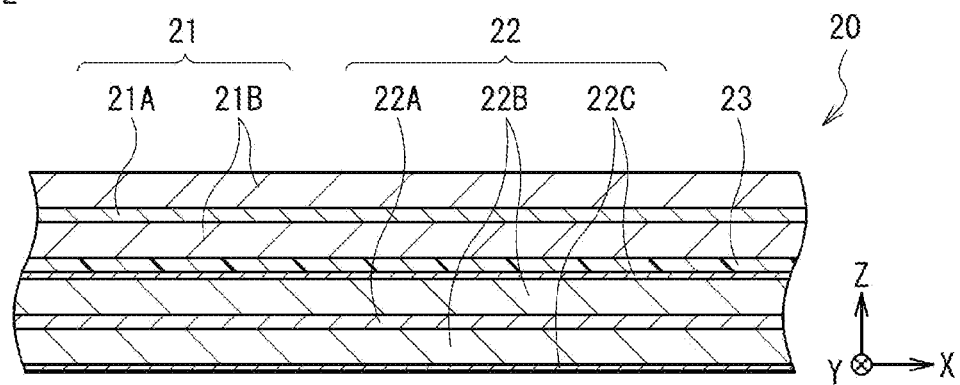
FIG. 2 is a sectional view of a configuration of a battery device illustrated in FIG. 1.

FIG. 1 illustrates a perspective configuration of the secondary battery. FIG. 2 illustrates a sectional configuration of a battery device 20 illustrated in FIG. 1. Note that FIG. 1 illustrates a state in which an outer package film 10 and the battery device 20 are separated away from each other, and FIG. 2 illustrates only a portion of the battery device 20.

As illustrated in FIGS. 1 and 2, the secondary battery includes the outer package film 10, the battery device 20, a positive electrode lead 31, a negative electrode lead 32, and sealing films 41 and 42. The secondary battery described here is a secondary battery of a laminated-film type in which the outer package film 10 having flexibility or softness is used as an outer package member to contain the battery device 20.

As illustrated in FIG. 1, the outer package film 10 is a flexible outer package member that contains the battery device 20, i.e., for example, a positive electrode 21, a negative electrode 22, and an electrolytic solution to be described later. The outer package film 10 has a pouch-shaped structure.

Here, the outer package film 10 is a single film-shaped member and is foldable in a folding direction R. The outer package film 10 has a depression part 10U to place the battery device 20 therein. The depression part 10U is a so-called deep drawn part.

The outer package film 10 is not particularly limited in configuration (e.g., material and number of layers), and may be a single-layered film or a multilayered film.

Here, the outer package film 10 is a three-layered laminated film including a fusion-bonding layer, a metal layer, and a surface protective layer that are stacked in this order from an inner side. The fusion-bonding layer includes a polymer compound such as polypropylene. The metal layer includes a metal material such as aluminum. The surface protective layer includes a polymer compound such as nylon. In a state where the outer package film 10 is folded, outer edges of the outer package film 10 (the fusion-bonding layer) opposed to each other are fusion-bonded to each other.

As illustrated in FIG. 1, the sealing films 41 and 42 are sealing members that each prevent entry of, for example, outside air into the inside of the outer package film 10. The sealing film 41 is interposed between the outer package film 10 and the positive electrode lead 31. The sealing film 42 is interposed between the outer package film 10 and the negative electrode lead 32. Note that the sealing film 41, the sealing film 42, or both may be omitted.

Specifically, the sealing film 41 includes a polymer compound, such as polyolefin, that has adherence to the positive electrode lead 31. Examples of the polyolefin include polypropylene.

The sealing film 42 has a configuration similar to that of the sealing film 41, except that the sealing film 42 has adherence to the negative electrode lead 32. In other words, the sealing film 42 includes a polymer compound, such as polyolefin, that has adherence to the negative electrode lead 32.

As illustrated in FIGS. 1 and 2, the battery device 20 is a power generation device contained inside the outer package film 10, and includes the positive electrode 21, the negative electrode 22, a separator 23, and the electrolytic solution. The electrolytic solution is not illustrated.

Here, the battery device 20 is a so-called wound electrode body. Thus, in the battery device 20, the positive electrode 21 and the negative electrode 22 are stacked on each other with the separator 23 interposed therebetween, and the stack of the positive electrode 21, the negative electrode 22, and the separator 23 is wound about a winding axis. The winding axis is a virtual axis extending in a Y-axis direction. In other words, the positive electrode 21 and the negative electrode 22 are opposed to each other with the separator 23 interposed therebetween.

The battery device 20 has an elongated three-dimensional shape. Accordingly, a section of the battery device 20 intersecting the winding axis, that is, a section of the battery device 20 along an XZ plane, has an elongated shape defined by a major axis and a minor axis. The major axis is a virtual axis that extends in an X-axis direction and has a larger length than the minor axis. The minor axis is a virtual axis that extends in a Z-axis direction intersecting the X-axis direction and has a smaller length than the major axis. Here, the section of the battery device 20 has an elongated, generally elliptical shape.

As illustrated in FIG. 2, the positive electrode 21 includes a positive electrode current collector 21A and a positive electrode active material layer 21B.

The positive electrode current collector 21A has two opposed surfaces on each of which the positive electrode active material layer 21B is to be disposed. The positive electrode current collector 21A includes an electrically conductive material such as a metal material. Examples of the metal material include aluminum.

The positive electrode active material layer 21B includes one or more of positive electrode active materials into which lithium is insertable and from which lithium is extractable. The positive electrode active material layer 21B is provided on each of the two opposed surfaces of the positive electrode current collector 21A. Note that the positive electrode active material layer 21B may further include, for example, a positive electrode binder and a positive electrode conductor, and may be provided only on one of the two opposed surfaces of the positive electrode current collector 21A. A method of forming the positive electrode active material layer 21B is not particularly limited, and specific examples thereof include a coating method.

The positive electrode active material includes a lithium compound. The term "lithium compound" is a generic term for a compound that includes lithium as a constituent element. More specifically, the lithium compound is a compound that includes lithium and one or more transition metal elements as constituent elements. A reason for this is that a high energy density is obtainable. Note that the lithium compound may further include one or more of other elements (excluding lithium and transition metal elements). Although not particularly limited in kind, the lithium compound is specifically an oxide, a phosphoric acid compound, a silicic acid compound, or a boric acid compound, for example. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

As illustrated in FIG. 2, the negative electrode 22 includes a film 22C covering a negative electrode active material layer 22B. More specifically, the negative electrode 22 includes a negative electrode current collector 22A, the negative electrode active material layer 22B, and the film 22C.

The negative electrode current collector 22A has two opposed surfaces on each of which the negative electrode active material layer 22B is to be disposed. The negative electrode current collector 22A includes an electrically conductive material such as a metal material. Examples of the metal material include copper.

The negative electrode active material layer 22B includes one or more of negative electrode active materials into which lithium is insertable and from which lithium is extractable. The negative electrode active material layer 22B is disposed on each of the two opposed surfaces of the negative electrode current collector 22A. Note that the negative electrode active material layer 22B may further include, for example, a negative electrode binder and a negative electrode conductor, and may be provided only on one of the two opposed surfaces of the negative electrode current collector 22A. Details of the negative electrode binder are similar to those of the positive electrode binder. Details of the negative electrode conductor are similar to those of the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material includes a carbon material, a metal-based material, or both, for example. A reason for this is that a high energy density is obtainable. Examples of the carbon material include graphitizable carbon, non-graphitizable carbon, and graphite (natural graphite and artificial graphite). The term "metal-based material" is a generic term for a material that includes, as a constituent element or constituent elements, one or more elements among metal elements and metalloid elements that are each able to form an alloy with lithium. Examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq 2$ or $0.2<x<1.4$).

The film 22C may cover an entire surface of the negative electrode active material layer 22B, or may cover only a portion of the surface of the negative electrode active material layer 22B. Note that in the latter case, multiple films 22C may cover the surface of the negative electrode active material layer 22B at respective locations separate from each other. FIG. 2 illustrates a case where the film 22C covers the entire surface of the negative electrode active material layer 22B.

As will be described later, the film 22C is formed on the surface of the negative electrode active material layer 22B through an immersion treatment on the negative electrode active material layer 22B and a stabilization treatment (a charge and discharge treatment) on the secondary battery after assembly in a process of manufacturing the secondary battery. Thus, the film 22C includes one or more of products including, without limitation, a reaction product and a deposition product of a substance (a boron-containing compound) in an immersion solution used in the immersion treatment as one or more components, and also includes one or more of products including, without limitation, a reaction product and a deposition product of a substance (a sulfur-containing compound) in the electrolytic solution as one or more components.

The boron-containing compound is a substance to be a source of boron and, more specifically, is a compound including boron as a constituent element. The sulfur-containing compound is a substance to be a source of sulfur and, more specifically, is a compound including sulfur as a constituent element. Accordingly, the film 22C formed through the use of the immersion treatment and the stabilization treatment described above includes boron and sulfur as constituent elements.

In the secondary battery, predetermined physical property conditions are satisfied regarding a physical property of the film 22C in order to improve a swelling characteristic. Details of the physical property of the film 22C will be described later.

The separator 23 is an insulating porous film interposed between the positive electrode 21 and the negative electrode 22 as illustrated in FIG. 2, and allows lithium ions to pass therethrough while preventing contact or a short circuit between the positive electrode 21 and the negative electrode 22. The separator 23 includes a polymer compound such as polyethylene.

The positive electrode 21, the negative electrode 22, and the separator 23 are each impregnated with the electrolytic solution. The electrolytic solution includes a solvent and an electrolyte salt.

The solvent includes one or more of chain carboxylic acid esters which are non-aqueous solvents (organic solvents). A reason for this is that the chain carboxylic acid esters are low in viscosity and thus serve to improve an ionic conductivity (a lithium-ion conductive property) of the electrolytic solution. As a result, a charge and discharge characteristic at a high rate (a high charging current and a high discharging current) is improved, and a decrease in battery capacity is thus suppressed even if the secondary battery is charged and discharged at a high rate. The chain carboxylic acid ester is not particularly limited in kind, and specific examples thereof include methyl acetate, ethyl acetate, methyl propionate, ethyl propionate, propyl propionate, isopropyl propionate, methyl butyrate, ethyl butyrate, and ethyl isobutyrate. A content of the chain carboxylic acid ester in the solvent is not particularly limited, and may be chosen as desired. An electrolytic solution including a non-aqueous solvent (a chain carboxylic acid ester) is a so-called non-aqueous electrolytic solution.

The solvent may further include one or more of other non-aqueous solvents. The other non-aqueous solvents are not particularly limited in kind, and specifically include, for example, a carbonic-acid-ester-based compound and a lactone-based compound. Examples of the carbonic-acid-ester-based compound include a cyclic carbonic acid ester and a chain carbonic acid ester.

Note that the solvent may include one or more of the sulfur-containing compounds. A reason for this is that even if the film 22C is partly decomposed upon charging and discharging, it becomes easier to additionally form the film 22C using a reaction of the sulfur-containing compound at a subsequent cycle of charging and discharging. This makes it easier to maintain each of physical property conditions 1 to 3 described later even upon repeated charging and discharging.

As described above, the sulfur-containing compound is a substance to be a source of sulfur, that is, a compound including sulfur as a constituent element. The sulfur-containing compound may be a cyclic compound or a chain compound. Further, the sulfur-containing compound may include a carbon-carbon double bond, a carbon-carbon triple bond, or both. The carbon-carbon double bond and the carbon-carbon triple bond are unsaturated carbon bonds.

Although not particularly limited in kind, the sulfur-containing compound is specifically, for example, a cyclic sulfonic acid ester, a chain sulfonic acid ester, a cyclic disulfonic acid anhydride, or a cyclic sulfonic acid carboxylic acid anhydride. A content of the sulfur-containing compound in the electrolytic solution is not particularly limited, and may be chosen as desired.

Specific examples of the cyclic sulfonic acid ester include propane sultone (1,3-propane sultone), propene sultone (1-propene 1,3-sultone), 4-methyl-1,3,2-dioxathiolane-2,2-dioxide, and 1,3,2-dioxathiolane-2,2-dioxide. Specific examples of the chain sulfonic acid ester include propargyl methanesulfonate, propargyl ethanesulfonate, and 2-propynyl benzenesulfonate. Examples of the cyclic disulfonic acid anhydride include an ethane disulfonic acid anhydride and a propane disulfonic acid anhydride. Specific examples of the cyclic sulfonic acid carboxylic acid anhydride include a sulfobenzoic acid anhydride, a sulfopropionic acid anhydride, and a sulfobutyric acid anhydride.

The electrolyte salt includes one or more of light metal salts including, without limitation, a lithium salt. A content of the electrolyte salt in the electrolytic solution is not particularly limited, and may be chosen as desired.

As illustrated in FIG. 1, the positive electrode lead 31 is a positive electrode terminal coupled to the battery device 20 (the positive electrode 21), and is led out from inside to outside the outer package film 10. The positive electrode lead 31 includes an electrically conductive material such as aluminum. The positive electrode lead 31 has a shape such as a thin plate shape or a meshed shape.

As illustrated in FIG. 1, the negative electrode lead 32 is a negative electrode terminal coupled to the battery device 20 (the negative electrode 22). Here, the negative electrode lead 32 is led out from inside to outside the outer package film 10 toward a direction similar to that in the positive electrode 21. The negative electrode lead 32 includes an electrically conductive material such as copper. Details of a shape of the negative electrode lead 32 are similar to those of the shape of the positive electrode lead 31.

In the secondary battery, as described above, the predetermined physical property conditions are satisfied regarding the physical property of the film 22C in order to improve the swelling characteristic.

Specifically, according to an analysis of the film 22C by inductively coupled plasma (ICP) optical emission spectroscopy, all of the following three physical property conditions are satisfied regarding a result of the analysis.

(Physical Property Condition 1)

A content CB of boron in the film 22C is within a range from 10 $\mu mol/m^2$ to 30 $\mu mol/m^2$ both inclusive. That is, where the content CB of boron included in the film 22C is measured by analyzing the film 22C by ICP optical emission spectroscopy, the content CB falls within the above-described range.

The content CB is adjustable to a desired value by changing conditions including, without limitation, the kind and the content of the boron-containing compound included in the immersion solution and an immersion time for the negative electrode active material layer 22B in the immersion solution.

(Physical Property Condition 2)

A content CS of sulfur in the film 22C is within a range from 20 $\mu mol/m^2$ to 70 $\mu mol/m^2$ both inclusive. That is, where the content CS of sulfur included in the film 22C is measured by analyzing the film 22C by ICP optical emission spectroscopy, the content CS falls within the above-described range.

The content CS is adjustable to a desired value by changing conditions including, without limitation, the kind and the content of the sulfur-containing compound included in the electrolytic solution.

(Physical Property Condition 3)

A ratio (a content ratio R) of the content CS of sulfur to the content CB of boron is within a range from 1.0 to 3.0 both inclusive. That is, the content ratio R (=content CS/content CB) calculated on the basis of the contents CB and CS described above falls within the above-described range.

The content ratio R is adjustable to a desired value by changing each of the contents CB and CS, as described above.

A reason for achieving satisfaction of all of the physical property conditions 1 to 3 is that this markedly improves electrochemical durability of the film 22C. As a result, a decomposition reaction of the electrolytic solution is specifically suppressed at the surface of the negative electrode active material layer 22B, and accordingly, gas generation due to the decomposition reaction of the electrolytic solution is markedly suppressed. Details of the reason for the above will be described later.

A procedure of analyzing the film 22C by ICP optical emission spectroscopy to thereby identify each of the contents CB and CS and the content ratio R is as described below.

First, the secondary battery is discharged until a voltage reaches 3 V. A current at the time of the discharge is not particularly limited and may thus be chosen as desired. Thereafter, the secondary battery after the discharge is disassembled to thereby collect the negative electrode 22. Thereafter, the negative electrode 22 is washed with a washing solvent. Although not particularly limited in kind, the washing solvent is specifically an organic solvent such as dimethyl carbonate. Thereafter, the negative electrode 22 is punched into a disk shape (19 mm in diameter) to thereby obtain a sample for analysis.

Thereafter, the sample (the film 22C) is analyzed by means of an ICP optical emission spectrometer to thereby measure the content ($\mu mol$) of each of boron and sulfur included in the film 22C. As the ICP optical emission spectrometer, for example, SPS 3500, a sequential-type ICP optical emission spectrometer manufactured by Hitachi High-Tech Science Corporation (formerly: SII Nanotechnology Inc.) is usable. Thereafter, the content CB ($\mu mol/m^2$) of boron and the content CS ($\mu mol/m^2$) of sulfur are each calculated on the basis of an area ($m^2$) of the sample.

Lastly, the content ratio R (=content CS/content CB) is calculated on the basis of the contents CB and CS. In this manner, the contents CB and CS are measured and the content ratio R is calculated on the basis of the analysis result on the film 22C obtained by ICP optical emission spectroscopy.

Upon charging the secondary battery, in the battery device 20, lithium is extracted from the positive electrode 21 and the extracted lithium is inserted into the negative electrode 22 via the electrolytic solution. Upon discharging the secondary battery, in the battery device 20, lithium is extracted from the negative electrode 22 and the extracted lithium is inserted into the positive electrode 21 via the electrolytic solution. Upon the charging and the discharging, lithium is inserted and extracted in an ionic state.

The secondary battery is manufactured in accordance with a procedure described below. In this case, as will be described later, the secondary battery is assembled using the positive electrode 21, a negative electrode precursor, and the electrolytic solution, following which the stabilization treatment is performed on the secondary battery.

The positive electrode active material and other materials including, without limitation, the positive electrode binder and the positive electrode conductor, are mixed with each other to thereby obtain a positive electrode mixture, following which the positive electrode mixture is put into a solvent such as an organic solvent to thereby prepare a paste positive electrode mixture slurry. Thereafter, the positive electrode mixture slurry is applied on each of the two opposed surfaces of the positive electrode current collector 21A to thereby form the positive electrode active material layer 21B. Thereafter, the positive electrode active material layer 21B may be compression-molded by means of, for example, a roll pressing machine. In this case, the positive electrode active material layer 21B may be heated. The positive electrode active material layer 21B may be compression-molded multiple times. In this manner, the positive electrode active material layer 21B is formed on each of the two opposed surfaces of the positive electrode current collector 21A. Thus, the positive electrode 21 is fabricated.

The negative electrode active material layer 22B is fabricated in accordance with a procedure similar to the above-described procedure of forming the positive electrode active material layer 21B. Specifically, the negative electrode active material and other materials including, without limitation, the negative electrode binder and the negative electrode conductor, are mixed with each other to thereby obtain a negative electrode mixture, following which the negative electrode mixture is put into a solvent such as an organic solvent to thereby prepare a paste negative electrode mixture slurry. Thereafter, the negative electrode mixture slurry is applied on each of the two opposed surfaces of the negative electrode current collector 22A to thereby form the negative electrode active material layer 22B. Thereafter, the negative electrode active material layer 22B may be compression-molded.

Thereafter, the boron-containing compound is put into a solvent such as an organic solvent to thereby prepare the immersion solution. The immersion solution is a solution to be used to form the film 22C through the immersion treatment, and includes one or more of the boron-containing compounds. The organic solvent is not particularly limited in kind, and specifically includes one or more of the carbonic-acid-ester-based compounds described above. The content of the boron-containing compound in the immersion solution may be chosen as desired in accordance with conditions including, without limitation, the content CB of boron.

Although not particularly limited in kind, the boron-containing compound is specifically a boron-containing lithium salt, for example. Specific examples of the boron-containing lithium salt include lithium tetrafluoroborate ($LiBF_4$), lithium bis(oxalato)borate, and lithium difluoro(oxalato)borate.

Thereafter, the negative electrode current collector 22A with the negative electrode active material layer 22B formed thereon (hereinafter, simply referred to as the "negative electrode active material layer 22B") is immersed in the immersion solution. The immersion time may be chosen as desired in accordance with conditions including, without limitation, the content CB of boron. Thereafter, the negative electrode active material layer 22B is taken out of the immersion solution, following which the negative electrode active material layer 22B is dried to thereby volatilize the organic solvent. In this manner, a coating film of the immersion solution is formed on the surface of the negative electrode active material layer 22B. The negative electrode precursor is thus fabricated. The negative electrode precursor has a configuration similar to that of the negative electrode 22 except for including the coating film of the immersion solution instead of the film 22C.

Lastly, as will be described later, the secondary battery is assembled using the negative electrode precursor, following which the stabilization treatment (the charge and discharge treatment) is performed on the secondary battery. As a result, the film 22C including boron and sulfur as constituent elements is formed on the surface of the negative electrode active material layer 22C. In this manner, the negative electrode active material layer 22B and the film 22C are formed on each of the two opposed surfaces of the negative electrode current collector 22A. Thus, the negative electrode 22 is fabricated.

The electrolyte salt is put into the solvent, following which the sulfur-containing compound is added to the solvent. The electrolyte salt and the sulfur-containing compound are each thereby dispersed or dissolved in the solvent. Thus, the electrolytic solution is prepared. The content of the sulfur-containing compound in the immersion solution may be chosen as desired in accordance with conditions including, without limitation, the content CS of the sulfur.

First, the positive electrode lead 31 is coupled to the positive electrode 21 (the positive electrode current collector 21A) by a method such as a welding method, and the negative electrode lead 32 is coupled to the negative electrode 22 (the negative electrode current collector 22A) by a method such as a welding method.

Thereafter, the positive electrode 21 and the negative electrode precursor are stacked on each other with the separator 23 interposed therebetween, following which the stack of the positive electrode 21, the negative electrode precursor, and the separator 23 is wound to thereby fabricate a wound body. The wound body has a configuration similar to that of the battery device 20 except that the wound body includes the negative electrode precursor instead of the negative electrode 22 and that the positive electrode 21, the negative electrode precursor, and the separator 23 are each unimpregnated with the electrolytic solution. Thereafter, the wound body is pressed by means of, for example, a pressing machine to thereby shape the wound body into an elongated shape.

Thereafter, the wound body is placed inside the depression part 10U, following which the outer package film 10 is folded to thereby cause portions of the outer package film 10 to be opposed to each other. Thereafter, outer edges of two sides of the outer package film 10 (the fusion-bonding layer) opposed to each other are fusion-bonded to each other by a method such as a thermal-fusion-bonding method. The wound body is thereby contained inside the outer package film 10 shaped like a pouch.

Lastly, the electrolytic solution is injected into the pouch-shaped outer package film 10, following which the outer edges of the remaining one side of the outer package film 10 (the fusion-bonding layer) are fusion-bonded to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. The wound body is thereby impregnated with the electrolytic solution. In this manner, the battery device 20 which is the wound electrode body is fabricated, and the battery device 20 is sealed in the pouch-shaped outer package film 10. Thus, the secondary battery is assembled.

The secondary battery after being assembled is charged and discharged. Conditions including, without limitation, an environment temperature, the number of times of charging and discharging (i.e., the number of cycles), and charging and discharging conditions may be chosen as desired.

As a result, the film 22C including boron and sulfur as constituent elements is formed on the surface of the negative electrode active material layer 22B, as described above. Thus, the negative electrode 22 is fabricated. In this case, the surface of the negative electrode active material layer 22B is protected by the film 22C, which brings the secondary battery into an electrochemically stable state.

Note that, after the stabilization treatment on the secondary battery is completed, that is, after the negative electrode 22 is fabricated (the film 22C is formed on the surface of the negative electrode active material layer 22B), the sulfur-containing compound having been used to form the film 22C may or may not remain in the electrolytic solution.

Thus, the secondary battery including the outer package film 10, that is, the secondary battery of the laminated-film type, is completed.

According to the secondary battery, the negative electrode 22 includes the film 22C, and the electrolytic solution includes the chain carboxylic acid ester. In addition, all of the physical property conditions 1 to 3 described above are satisfied regarding the analysis result on the film 22C (the contents CB and CS and the content ratio R which are the physical property of the film 22C) obtained by ICP optical emission spectroscopy.

In this case, owing to the electrolytic solution including the chain carboxylic acid ester, the ionic conductivity of the electrolytic solution improves, as described above. Moreover, owing to all of the physical property conditions 1 to 3 being satisfied regarding the physical property of the film 22C, the electrochemical durability of the film 22C markedly improves. Accordingly, even if the electrolytic solution includes the chain carboxylic acid ester, a decomposition reaction of the electrolytic solution (the chain carboxylic acid ester) is specifically suppressed at the surface of the negative electrode active material layer 22B. As a result, even if the secondary battery is used (charged and discharged) and stored in a high-temperature environment, in particular, the decomposition reaction of the electrolytic solution is sufficiently suppressed, and gas generation is thus sufficiently suppressed.

Accordingly, even if the electrolytic solution includes the chain carboxylic acid ester, swelling of the secondary battery due to gas generation is effectively suppressed. It is thus possible to achieve a superior swelling characteristic.

Here, a possible mechanism by which gas generation due to the decomposition reaction of the electrolytic solution is markedly suppressed owing to the satisfaction of all of the physical property conditions 1 to 3 is as described below.

If the film 22C including boron as a constituent element is formed on the surface of the negative electrode active material layer 22B, the decomposition reaction of the electrolytic solution is suppressed at the surface of the negative electrode active material layer 22B even if the secondary battery is used and stored in a high-temperature environment. Accordingly, gas generation due to the decomposition reaction of the electrolytic solution is suppressed. The film 22C including boron as a constituent element is formed on the surface of the negative electrode active material layer 22B by charging and discharging the secondary battery including the electrolytic solution that includes a boron-containing compound.

However, in a case where the electrolytic solution includes a chain carboxylic acid ester, the decomposition reaction of the electrolytic solution (the chain carboxylic acid ester) is not sufficiently suppressed at the surface of the negative electrode active material layer 22B even if the film 22C including boron as a constituent element is formed on the surface of the negative electrode active material layer 22B. Accordingly, it becomes easier for gas to be generated. A reason for this is that the chain carboxylic acid ester which is the solvent in the electrolytic solution has a property of being decomposed more easily than, for example, a carbonic-acid-ester-based compound upon charging and discharging.

A conceivable approach to addressing such an issue is to form the film 22C that includes sulfur, together with boron, as a constituent element by charging and discharging a secondary battery including an electrolytic solution that includes a sulfur-containing compound together with the boron-containing compound, as a method of manufacturing a secondary battery of a comparative example against the secondary battery of an embodiment.

In such a case, the film 22C including sulfur as a constituent element together with boron helps to prevent the decomposition reaction of the electrolytic solution (the chain carboxylic acid ester) from easily occurring at the surface of the negative electrode active material layer 22B even if the electrolytic solution includes the chain carboxylic acid ester. Accordingly, gas is prevented from being generated easily. A possible reason for this is that the boron-containing compound which is electrophilic and the sulfur-containing compound which is nucleophilic are firmly bonded to each other when the film 22C is formed, that is, during the charge and discharge treatment, to thereby improve the electrochemical durability of the film 22C.

In a case of forming the film 22C including boron and sulfur as constituent elements, however, it is actually difficult to sufficiently improve the electrochemical durability of the film 22C.

A reason for this is that, in a case where the electrolytic solution includes both the boron-containing compound and the sulfur-containing compound, the film 22C including sulfur derived from the sulfur-containing compound is easily formed preferentially upon charging and discharging, before the film 22C including boron derived from the boron-containing compound is formed. This makes it possible for the film 22C to sufficiently include sulfur as a constituent element, but makes it difficult for the film 22C to sufficiently include boron as a constituent element.

A further reason is that, in a case where the film 22C derived from the boron-containing compound is formed, an oxidative decomposition reaction of the boron-containing compound in the positive electrode 21 proceeds preferentially over a reductive decomposition reaction of the boron-containing compound in the negative electrode 22. This facilitates formation of a film derived from the boron-containing compound on a surface of the positive electrode active material layer 21B and facilitates formation of the film 22C derived from the sulfur-containing compound on the surface of the negative electrode active material layer 22B. As a result, it is still difficult for the film 22C formed on the surface of the negative electrode active material layer 22B to sufficiently include boron as a constituent element.

Accordingly, in the secondary battery manufactured by the manufacturing method of the comparative example, even if the electrolytic solution includes both the boron-containing compound and the sulfur-containing compound, it is actually difficult to form the film 22C that appropriately includes both boron and sulfur as constituent elements to improve the electrochemical durability, that is, the film 22C satisfying all of the physical property conditions 1 to 3.

In contrast, according to the method of manufacturing the secondary battery of an embodiment, as described above, the negative electrode active material layer 22B is immersed in the immersion solution including the boron-containing compound, following which the secondary battery including the electrolytic solution that includes the sulfur-containing compound is subjected to the stabilization treatment (the charge and discharge treatment) to thereby form the film 22C.

In this case, in a state in which the boron-containing compound is present in a sufficient amount on the surface of the negative electrode active material layer 22B after the immersion treatment, the secondary battery including the electrolytic solution that includes the sulfur-containing compound is charged and discharged to thereby form the film 22C on the surface of the negative electrode active material layer 22B. This makes it possible for the film 22C not only to sufficiently include sulfur as a constituent element but also to sufficiently include boron as a constituent element. Accordingly, all of the physical property conditions 1 to 3 are satisfied.

Thus, in the secondary battery manufactured by the manufacturing method of an embodiment, the film 22C that appropriately includes both boron and sulfur as constituent elements, that is, the film 22C satisfying all of the physical property conditions 1 to 3 is formed, unlike in the secondary battery manufactured by the manufacturing method of the comparative example described above.

Based upon the foregoing, according to the secondary battery of an embodiment, all of the physical property conditions 1 to 3 are satisfied to sufficiently improve the electrochemical durability of the film 22C. Thus, gas generation due to the decomposition reaction of the electrolytic solution (the chain carboxylic acid ester) is markedly suppressed. Accordingly, even if the electrolytic solution includes the chain carboxylic acid ester, swelling of the secondary battery is effectively suppressed. It is thus possible to improve the swelling characteristic. In this case, swelling of the secondary battery is sufficiently suppressed even if the secondary battery is used and stored in a high-temperature environment. Accordingly, it is possible to effectively improve the swelling characteristic.

The electrolytic solution may include the sulfur-containing compound, in particular. In such a case, the film 22C is additionally formed during use (charging and discharging) of the secondary battery. This makes it easier for the physical property conditions 1 to 3 to be maintained even upon repeated charging and discharging. Accordingly, it is possible to achieve higher effects. In this case, the sulfur-containing compound may include, without limitation, the cyclic sulfonic acid ester. This makes it further easier for the physical property conditions 1 to 3 to be maintained. Accordingly, it is possible to achieve even higher effects.

Further, the secondary battery may include the outer package film 10 having flexibility. Also in a case where the flexible outer package film 10 is used which is easily deformable in response to a change in internal pressure or gas generation due to the decomposition reaction of the electrolytic solution (the chain carboxylic acid ester), the swelling of the secondary battery is effectively suppressed. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

Next, a description is given of modifications of the above-described secondary battery according to an embodiment. The configuration of the secondary battery is appropriately modifiable as described below. Note that any two or more of the following series of modifications may be combined with each other.

The separator 23 which is a porous film is used. However, although not specifically illustrated here, a separator of a stacked type including a polymer compound layer may be used instead of the separator 23 which is the porous film.

Specifically, the separator of the stacked type includes a porous film having two opposed surfaces, and the polymer compound layer provided on one of or each of the two opposed surfaces of the porous film. A reason for this is that adherence of the separator to each of the positive electrode 21 and the negative electrode 22 improves to suppress the occurrence of misalignment of the battery device 20 (irregular winding of each of the positive electrode 21, the negative electrode 22, and the separator). This helps to prevent the secondary battery from easily swelling even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that such insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent, is prepared and thereafter the precursor solution is applied on one of or each of the two opposed surfaces of the porous film. In this case, the insulating particles may be added to the precursor solution on an as-needed basis.

Also in the case where the separator of the stacked type is used, lithium ions are movable between the positive electrode 21 and the negative electrode 22. Accordingly, it is possible to achieve similar effects.

The electrolytic solution which is a liquid electrolyte is used.

However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that liquid leakage is prevented. The configuration of the electrolytic solution is as described above. The polymer compound includes, for example, polyvinylidene difluoride. In a case of forming the electrolyte layer, a precursor solution including, without limitation, the electrolytic solution, the polymer compound, and an organic solvent is prepared and thereafter the precursor solution is applied on one side or both sides of the positive electrode 21 and one side or both sides of the negative electrode 22.

Also in the case where the electrolyte layer is used, lithium ions are movable between the positive electrode 21 and the negative electrode 22 via the electrolyte layer. Accordingly, it is possible to achieve similar effects.

Next, a description is given of applications (application examples) of the above-described secondary battery according to an embodiment.

The applications of the secondary battery are not particularly limited. The secondary battery used as a power source may serve as a main power source or an auxiliary power source of, for example, electronic equipment or an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home or industrial battery systems for accumulation of electric power for a situation such as emergency. In these applications, one secondary battery or a plurality of secondary batteries may be used.

The battery pack may include a single battery, or may include an assembled battery. The electric vehicle is a vehicle that operates (travels) using the secondary battery as a driving power source, and may be a hybrid automobile that is additionally provided with a driving source other than the secondary battery. An electric power storage system for home use allows, for example, home appliances to be used by utilizing electric power accumulated in the secondary battery which is an electric power storage source.

One of application examples of the secondary battery will now be described in detail. The configuration of the application example described below is merely an example, and is appropriately modifiable.

Figure 3:
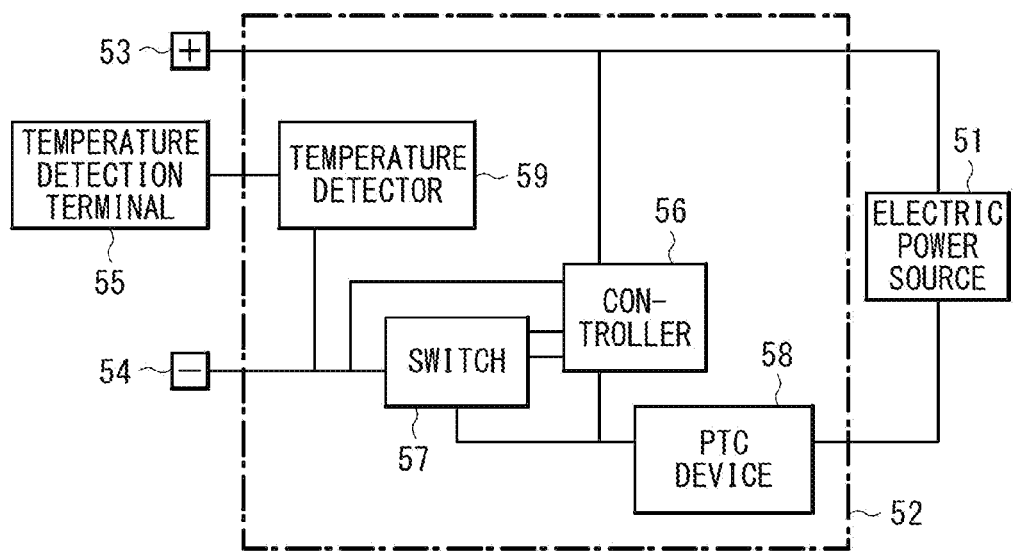
FIG. 3 is a block diagram illustrating a configuration of an application example of the secondary battery.

FIG. 3 illustrates a block configuration of a battery pack. The battery pack described here is a battery pack (a so-called soft pack) including one secondary battery, and is to be mounted on, for example, electronic equipment typified by a smartphone.

As illustrated in FIG. 3, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a thermosensitive resistive device (a PTC device) 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage and the overdischarge detection voltage are not particularly limited. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected on the basis of an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology below according to an embodiment.

Examples 1 to 11 and Comparative Examples 1 to 7

As described below, secondary batteries were manufactured, following which the secondary batteries were evaluated for their performance.

[Manufacture of Secondary Battery]

The secondary batteries (lithium-ion secondary batteries) of the laminated-film type were manufactured in accordance with a procedure described below.

(Fabrication of Positive Electrode)

First, 95 parts by mass of the positive electrode active material, 4 parts by mass of the positive electrode binder (polyvinylidene difluoride), and 1 part by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on each of the two opposed surfaces of the positive electrode current collector 21A (a band-shaped aluminum foil having a thickness of 15 μm) by means of a coating apparatus, following which the applied positive electrode mixture slurry was dried to thereby form the positive electrode active material layer 21B. Lastly, the positive electrode active material layer 21B was compression-molded by means of a roll pressing machine. Thus, the positive electrode 21 was fabricated.

(Fabrication of Negative Electrode)

First, 90 parts by mass of the negative electrode active material (graphite) and 10 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on each of the two opposed surfaces of the negative electrode current collector 22A (a band-shaped copper foil having a thickness of 15 μm) by means of a coating apparatus, following which the applied negative electrode mixture slurry was dried to thereby form the negative electrode active material layer 22B. Thereafter, the negative electrode active material layer 22B was compression-molded by means of a roll pressing machine.

Thereafter, the negative electrode current collector 22A with the negative electrode active material layer 22B formed thereon was immersed in the immersion solution including the boron-containing compound (lithium tetrafluoroborate ($LiBF_4$)) and having a concentration of 1 mol/kg. The immersion time (hour) was as listed in Tables 1 to 3. Thereafter, the negative electrode current collector 22A with the negative electrode active material layer 22B formed thereon was taken out of the immersion solution to thereby dry the immersion solution applied on the surface of the negative electrode active material layer 22B. In this manner, a coating film of the immersion solution was formed on the surface of the negative electrode active material layer 22B. Thus, the negative electrode precursor was obtained.

Lastly, as will be described later, the secondary battery was assembled using the negative electrode precursor, following which the stabilization treatment (the charge and discharge treatment) was performed on the secondary battery. In this manner, the film 22C including boron and sulfur as constituent elements was formed on the surface of the negative electrode active material layer 22B. Thus, the negative electrode 22 was fabricated.

(Preparation of Electrolytic Solution)

The electrolyte salt (lithium hexafluorophosphate ($LiPF_6$)) was added to the solvent, following which the solvent was stirred. Used as the solvent were ethylene carbonate and propylene carbonate which are cyclic carbonic acid esters, and propyl propionate (PP) which is a chain carboxylic acid ester. In this case, a mixture ratio (a volume ratio) between ethylene carbonate, propylene carbonate, and the chain carboxylic acid ester in the solvent was set to 10:20:70, and the content of the electrolyte salt with respect to the solvent was set to 1 mol/kg.

Thereafter, the sulfur-containing compound (propane sultone (PS) which is a cyclic sulfonic acid ester) was added to the solvent including the electrolyte salt, following which the solvent was stirred. In this case, the content of the sulfur-containing compound in the electrolytic solution was set to 1 wt %. Thus, the electrolytic solution including the sulfur-containing compound was prepared.

(Assembly of Secondary Battery)

First, the positive electrode lead 31 (a band-shaped aluminum foil) was welded to the positive electrode 21 (the positive electrode current collector 21A), and the negative electrode lead 32 (a band-shaped copper foil) was welded to the negative electrode precursor (the negative electrode current collector 22A).

Thereafter, the positive electrode 21 and the negative electrode precursor were stacked on each other with the separator 23 (a fine-porous polyethylene film having a thickness of 25 μm) interposed therebetween, following which the stack of the positive electrode 21, the negative electrode precursor, and the separator 23 was wound to thereby fabricate the wound body. Thereafter, the wound body was pressed by means of a pressing machine to thereby shape the wound body into an elongated shape.

Thereafter, the outer package film 10 was folded in such a manner as to sandwich the wound body placed in the depression part 10U, following which the outer edges of two sides of the outer package film 10 (the fusion-bonding layer) were thermal-fusion-bonded to each other. The wound body was thereby contained inside the outer package film 10 shaped like a pouch. As the outer package film 10, an aluminum laminated film was used in which the fusion-bonding layer (a polypropylene film having a thickness of 30 μm), the metal layer (an aluminum foil having a thickness of 40 μm), and the surface protective layer (a nylon film having a thickness of 25 μm) were stacked in this order from the inner side.

Lastly, the electrolytic solution was injected into the pouch-shaped outer package film 10, following which the outer edges of the remaining one side of the outer package film 10 (the fusion-bonding layer) were thermal-fusion-bonded to each other in a reduced-pressure environment. In this case, the sealing film 41 (a polypropylene film having a thickness of 5 μm) was interposed between the outer package film 10 and the positive electrode lead 31, and the sealing film 42 (a polypropylene film having a thickness of 5 μm) was interposed between the outer package film 10 and the negative electrode lead 32. The wound body was thereby impregnated with the electrolytic solution. In this manner, the battery device 20, i.e., the wound electrode body, was fabricated, and the battery device 20 was sealed in the pouch-shaped outer package film 10. Thus, the secondary battery was assembled.

(Stabilization of Secondary Battery)

The secondary battery after being assembled was charged and discharged for one cycle in an ambient temperature environment (at a temperature of 25° C.). Upon the charging, the secondary battery was charged with a constant current of 0.1 C until a voltage reached 4.2 V, and was thereafter charged with a constant voltage of that value of 4.2 V until a current reached 0.005 C. Upon the discharging, the secondary battery was discharged with a constant current of 0.1 C until the voltage reached 2.5 V. Note that 0.1 C is a value of a current that causes a battery capacity (a theoretical capacity) to be completely discharged in 10 hours, and 0.005 C is a value of a current that causes the battery capacity to be completely discharged in 200 hours.

In this manner, as described above, the film 22C was formed on the surface of the negative electrode active material layer 22B in the negative electrode precursor, and the negative electrode 22 was thus fabricated. The state of the secondary battery was thereby stabilized, and as a result, the secondary battery of the laminated-film type was completed.

After the completion of the secondary battery, the secondary battery was disassembled to thereby collect the negative electrode 22, following which the negative electrode 22 (the film 22C) was analyzed by ICP optical emission spectroscopy to thereby measure each of the contents CB and CS ($\mu$mol/m$^2$) and calculate the content ratio R. This revealed the results presented in Tables 1 to 3.

In the process of manufacturing the secondary battery, the contents CB and CS and the content ratio R were each adjusted by changing one or more of the content of the boron-containing compound in the immersion solution, the immersion time in the immersion treatment, or the content of the sulfur-containing compound in the electrolytic solution.

For comparison, a secondary battery was fabricated in accordance with a similar procedure except that, instead of performing the immersion treatment, not only the sulfur-containing compound but also the boron-containing compound was included in the electrolytic solution. In this case, the content of the boron-containing compound in the electrolytic solution was set to 1 wt %. As a result, the film 22C including boron and sulfur as constituent elements was formed on the surface of the negative electrode active material layer 22B upon the stabilization treatment (upon charging and discharging) of the secondary battery. The contents CB and CS and the content ratio R in this case were each as listed in Table 1.

Evaluation of the secondary batteries for their performance (swelling characteristic) revealed the results presented in Tables 1 to 3.

In a case of examining the swelling characteristic, first, the secondary battery was charged in an ambient temperature environment (at a temperature of 23° C.), following which a thickness (a pre-storage thickness (mm)) of the secondary battery was measured. Charging conditions were similar to those in the stabilization treatment on the secondary battery described above. Thereafter, the secondary battery in the charged state was stored in a high-temperature environment (at a temperature of 60° C.) for a storage time of 720 hours, following which the thickness (a post-storage thickness (mm)) of the secondary battery was measured. Lastly, the following was calculated: swelling rate (%)= [(post-storage thickness−pre-storage thickness)/pre-storage thickness]×100.

TABLE 1

| | Immersion solution | | Electrolytic solution | | | Film | | | |
|---|---|---|---|---|---|---|---|---|---|
| | Boron-containing compound | Immersion time (hour) | Chain carboxylic acid ester | Sulfur-containing compound | Boron-containing compound | Content CB ($\mu$mol/m$^2$) | Content CS ($\mu$mol/m$^2$) | Content ratio R | Swelling rate (%) |
| Comparative Example 1 | LiBF$_4$ | 20 | PP | PS | — | 73.2 | 36.6 | 0.5 | 20.9 |
| Example 1 | LiBF$_4$ | 12 | PP | PS | — | 36.6 | 36.6 | 1.0 | 10.1 |
| Example 2 | LiBF$_4$ | 6 | PP | PS | — | 18.3 | 36.6 | 2.0 | 5.8 |
| Example 3 | LiBF$_4$ | 3 | PP | PS | — | 12.2 | 36.6 | 3.0 | 12.3 |
| Comparative Example 2 | LiBF$_4$ | 2 | PP | PS | — | 10.5 | 36.6 | 3.5 | 21.1 |
| Comparative Example 3 | — | — | PP | PS | LiBF$_4$ | 1.8 | 46.9 | 26.1 | 20.3 |

TABLE 2

| | Immersion solution | | Electrolytic solution | | | Film | | | |
|---|---|---|---|---|---|---|---|---|---|
| | Boron-containing compound | Immersion time (hour) | Chain carboxylic acid ester | Sulfur-containing compound | Boron-containing compound | Content CB ($\mu$mol/m$^2$) | Content CS ($\mu$mol/m$^2$) | Content ratio R | Swelling rate (%) |
| Comparative Example 4 | LiBF$_4$ | 2 | PP | PS | — | 10.0 | 15.0 | 1.5 | 21.9 |
| Example 4 | LiBF$_4$ | 2 | PP | PS | — | 10.0 | 20.0 | 2.0 | 14.3 |
| Example 5 | LiBF$_4$ | 3 | PP | PS | — | 12.5 | 25.0 | 2.0 | 10.2 |
| Example 2 | LiBF$_4$ | 6 | PP | PS | — | 18.3 | 36.6 | 2.0 | 5.8 |
| Example 6 | LiBF$_4$ | 8 | PP | PS | — | 25.0 | 50.0 | 2.0 | 6.1 |
| Example 7 | LiBF$_4$ | 11.5 | PP | PS | — | 35.0 | 70.0 | 2.0 | 16.9 |
| Comparative Example 5 | LiBF$_4$ | 12 | PP | PS | — | 37.5 | 75.0 | 2.0 | 22.4 |

TABLE 3

| | Immersion solution | | Electrolytic solution | | | Film | | | |
|---|---|---|---|---|---|---|---|---|---|
| | Boron-containing compound | Immersion time (hour) | Chain carboxylic acid ester | Sulfur-containing compound | Boron-containing compound | Content CB ($\mu mol/m^2$) | Content CS ($\mu mol/m^2$) | Content ratio R | Swelling rate (%) |
| Comparative Example 6 | $LiBF_4$ | 0.2 | PP | PS | — | 5.0 | 15.0 | 3.0 | 25.4 |
| Example 8 | $LiBF_4$ | 2 | PP | PS | — | 10.0 | 20.0 | 2.0 | 15.5 |
| Example 9 | $LiBF_4$ | 4 | PP | PS | — | 15.0 | 30.0 | 2.0 | 10.2 |
| Example 2 | $LiBF_4$ | 6 | PP | PS | — | 18.3 | 36.6 | 2.0 | 5.8 |
| Example 10 | $LiBF_4$ | 8 | PP | PS | — | 25.0 | 50.0 | 2.0 | 7.9 |
| Example 11 | $LiBF_4$ | 10 | PP | PS | — | 30.0 | 60.0 | 2.0 | 15.9 |
| Comparative Example 7 | $LiBF_4$ | 11.5 | PP | PS | — | 35.0 | 70.0 | 2.0 | 22.9 |

As indicated in Tables 1 to 3, the swelling characteristic greatly varied depending on the physical property of the film 22C (the contents CB and CS and the content ratio R).

Specifically, in a case where the immersion treatment using the immersion solution was performed (Examples 1 to 11 and Comparative examples 1, 2, and 4 to 7), the film 22C including both boron and sulfur as constituent elements was formed. Thus, the contents CB and CS were each measured, and the content ratio R was calculated.

In this case, if all of the three conditions, that is, the physical property condition 1 that the content CB is within the range from 10 $\mu mol/m^2$ to 30 $\mu mol/m^2$ both inclusive, the physical property condition 2 that the content CS is within the range from 20 $\mu mol/m^2$ to 70 $\mu mol/m^2$ both inclusive, and the physical property condition 3 that the content ratio R is within the range from 1.0 to 3.0 both inclusive, were satisfied (Examples 1 to 11), the swelling rate greatly decreased as compared with a case where not all of the physical property conditions 1 to 3 were satisfied (Comparative examples 1, 2, and 4 to 7).

Note that in a case without the immersion treatment using the immersion solution (Comparative example 3), the film 22C including both boron and sulfur as constituent elements was formed; however, not all of the physical property conditions 1 to 3 were satisfied, and the swelling rate thus increased.

Based upon the results presented in Tables 1 to 3, in a case where the negative electrode 22 included the film 22C, where the electrolytic solution included the chain carboxylic acid ester, and where all of the physical property conditions 1 to 3 were satisfied regarding the analysis result on the film 22C (the contents CB and CS and the content ratio R) obtained by ICP optical emission spectroscopy, the swelling rate greatly decreased. Accordingly, the secondary battery achieved a superior swelling characteristic.

Although the present technology has been described herein above with reference to one or more embodiments including Examples, the configuration of the present technology is not limited thereto, and is therefore modifiable in a variety of suitable ways.

For example, the description has been given of the case where the secondary battery has a battery structure of the laminated-film type. However, the battery structure is not particularly limited, and may be of any other type, such as a cylindrical type, a prismatic type, a coin type, or a button type.

Further, the description has been given of the case where the battery device has a device structure of the wound type. However, the device structure of the battery device is not particularly limited, and may be of any other type, such as a stacked type in which the electrodes (the positive electrode and the negative electrode) are stacked, or a zigzag folded type in which the electrodes (the positive electrode and the negative electrode) are folded in a zigzag manner.

Furthermore, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    a positive electrode;
    a negative electrode; and
    an electrolytic solution, wherein
    the negative electrode includes a film covering a negative electrode active material layer,
    the electrolytic solution includes a chain carboxylic acid ester, and
    according to an analysis of the film by inductively coupled plasma optical emission spectroscopy,
        a content of boron in the film is greater than or equal to 10 micromoles per square meter and less than or equal to 30 micromoles per square meter,
        a content of sulfur in the film is greater than or equal to 20 micromoles per square meter and less than or equal to 70 micromoles per square meter, and
        a ratio of the content of sulfur to the content of boron is greater than or equal to 1.0 and less than or equal to 3.0.

2. The secondary battery according to claim 1, wherein the electrolytic solution further includes a sulfur-containing compound.

3. The secondary battery according to claim 2, wherein the sulfur-containing compound includes at least one of a cyclic sulfonic acid ester, a chain sulfonic acid ester, a cyclic disulfonic acid anhydride, or a cyclic sulfonic acid carboxylic acid anhydride.

4. The secondary battery according to claim 1, further comprising an outer package member having flexibility and containing the positive electrode, the negative electrode, and the electrolytic solution.

5. The secondary battery according to claim 1, wherein the secondary battery comprises a lithium-ion secondary battery.

* * * * *